United States Patent
Mitsumori

(10) Patent No.: US 8,498,218 B2
(45) Date of Patent: Jul. 30, 2013

(54) COMMUNICATION APPARATUS AND METHOD IN A COMMUNICATION NETWORK SYSTEM

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 12/862,425

(22) Filed: Aug. 24, 2010

(65) Prior Publication Data

US 2011/0051748 A1 Mar. 3, 2011

(30) Foreign Application Priority Data

Aug. 25, 2009 (JP) ................. 2009-194391

(51) Int. Cl.
*H04L 12/56* (2006.01)
(52) U.S. Cl.
USPC ............ 370/252; 370/392; 370/401; 709/236
(58) Field of Classification Search
None
See application file for complete search history.

(56) References Cited

U.S. PATENT DOCUMENTS

| 2005/0226144 | A1* | 10/2005 | Okita | 370/219 |
|---|---|---|---|---|
| 2007/0263660 | A1* | 11/2007 | Mitsumori | 370/469 |
| 2008/0151907 | A1* | 6/2008 | Ge et al. | 370/395.53 |
| 2009/0067429 | A1* | 3/2009 | Nagai et al. | 370/392 |
| 2009/0300451 | A1* | 12/2009 | Koyanagi | 714/748 |
| 2009/0316704 | A1* | 12/2009 | Sodder et al. | 370/395.6 |
| 2010/0046533 | A1* | 2/2010 | Kuramoto et al. | 370/401 |
| 2011/0216772 | A1* | 9/2011 | Mohan et al. | 370/392 |

FOREIGN PATENT DOCUMENTS

| JP | 2008-167331 A | 7/2008 |
|---|---|---|
| WO | WO 2008/054817 A1 | 5/2008 |

OTHER PUBLICATIONS

Asami, Toru, "Nation-wide Ethernet Service: The History of Commercial Services and the Direction of Protocol Developments," The Journal of the Institute of Electronics, Information and Communication Engineers (IEICE), vol. 90, No. 6, Jun. 1, 2007, pp. 470-475, with Partial English-language Translation & Pursuant to MPEP §609, in fulfillment of the requirement under 37 CFR §1.98(a)(3)(i) for a concise explanation of relevance regarding this cited reference, the Office's attention is directed to the Partial English-language translation of the official action mailed by the JPO as listed in this section of this form SB08.
Japanese Office Action mailed Apr. 9, 2013 for corresponding Japanese Application No. 2009-194391, with Partial English-language Translation.

* cited by examiner

*Primary Examiner* — Hassan Phillips
*Assistant Examiner* — Duc Duong
(74) *Attorney, Agent, or Firm* — Fujitsu Patent Center

(57) ABSTRACT

A communication apparatus including: a reception unit configured to, receive a first frame having a first format and a second frame having a second format in which information is reduced with respect to the first format and extract a first identifier existing in both the first frame and the second frame; a first frame processing unit configured to process the first frame; a second frame processing unit configured to process the second frame; a table including a correspondence between the first identifier and a second identifier indicating whether the first frame and the second frame having the first identifier is in the first format or the second format; and a control unit configured to transfer the first frame or the second frame to one of the first frame processing unit and the second frame processing unit based on the table when the frame is received.

10 Claims, 23 Drawing Sheets

FIG. 6

| ENTRY VALID FLAG | S-OAM VALID FLAG | ... | S-OAM FRAME FORMAT FLAG | S-OAM E-TYPE VALUE |
|---|---|---|---|---|
| 1 | 0 | ... | 0 | 0x0000 |
| 1 | 1 | ... | 0 | 0xAAAA |
| 1 | 1 | ... | 1 | 0xAAAA |
| ... | | | | |

3510

↑ (INDEX)
I-TAG VLAN ID

FIG. 7

| ENTRY VALID FLAG | S-OAM VALID FLAG | S-OAM FRAME FORMAT FLAG | RECEPTION FRAME PROCESSING CONTENT |
|---|---|---|---|
| 0 | — | — | DISCARD |
| 1 | 0 | 0 | TRANSMIT TO RECEPTION FRAME PROCESSING UNIT |
| 1 | 0 | 1 | TRANSMIT TO RECEPTION FRAME PROCESSING UNIT |
| 1 | 1 | 0 | TRANSMIT TO FIRST S-OAM DETERMINATION UNIT AND EXTRACTION UNIT |
| 1 | 1 | 1 | TRANSMIT TO SECOND S-OAM DETERMINATION UNIT AND EXTRACTION UNIT |

S-OAM CCM FRAME (STANDARD SPECIFICATION, USER TAG ABSENT FORMAT)

S-OAM CCM FRAME (STANDARD SPECIFICATION, USER TAG PRESENT FORMAT)

S-OAM CCM FRAME (SHORTENED FORMAT)

FIG. 9

| I-TAG VLAN ID (INDEX) | ENTRY VALID FLAG | S-OAM VALID FLAG | S-OAM FRAME FORMAT FLAG | ... | S-OAM E-TYPE VALUE | NUMBER OF VLAN STAGES |
|---|---|---|---|---|---|---|
| 100 | 1 | 0 | 0 | | 0x0000 | 0 |
| 101 | 1 | 1 | 0 | | 0xAAAA | 0 |
| 102 | 1 | 1 | 1 | | 0xAAAA | 2 |
| | | | | ... | | |

| I-TAG VLAN ID (INDEX) | ENTRY VALID FLAG | S-OAM VALID FLAG | ... | S-OAM FRAME FORMAT FLAG | NUMBER OF VLAN STAGES |
|---|---|---|---|---|---|
| 100 | 1 | 0 | | 0x0000 | 0 |
| 101 | 1 | 1 | | 0xAAAAA | 0 |
| 102 | 1 | 1 | | 0xAAAAA | 2 |
| ... | | | | | |

| 8 | 7 | 6 | 5 | 4 | 3 | 2 | 1 |
|---|---|---|---|---|---|---|---|
| RDI | RESERVED (0) | | | | PERIOD | | |

FIG. 13B

| FLAGS[3:1] | PERIOD VALUE | COMMENTS |
|---|---|---|
| 000 | INVALID VALUE | INVALID VALUE FOR CCM PDUS |
| 001 | 3.33MS | 300 FRAMES PER SECOND |
| 010 | 10MS | 100 FRAMES PER SECOND |
| 011 | 100MS | 10 FRAMES PER SECOND |
| 100 | 1S | 1 FRAME PER SECOND |
| 101 | 10S | 6 FRAMES PER MINUTE |
| 110 | 1MIN | 1 FRAME PER MINUTE |
| 111 | 10MIN | 6 FRAME PER HOUR |

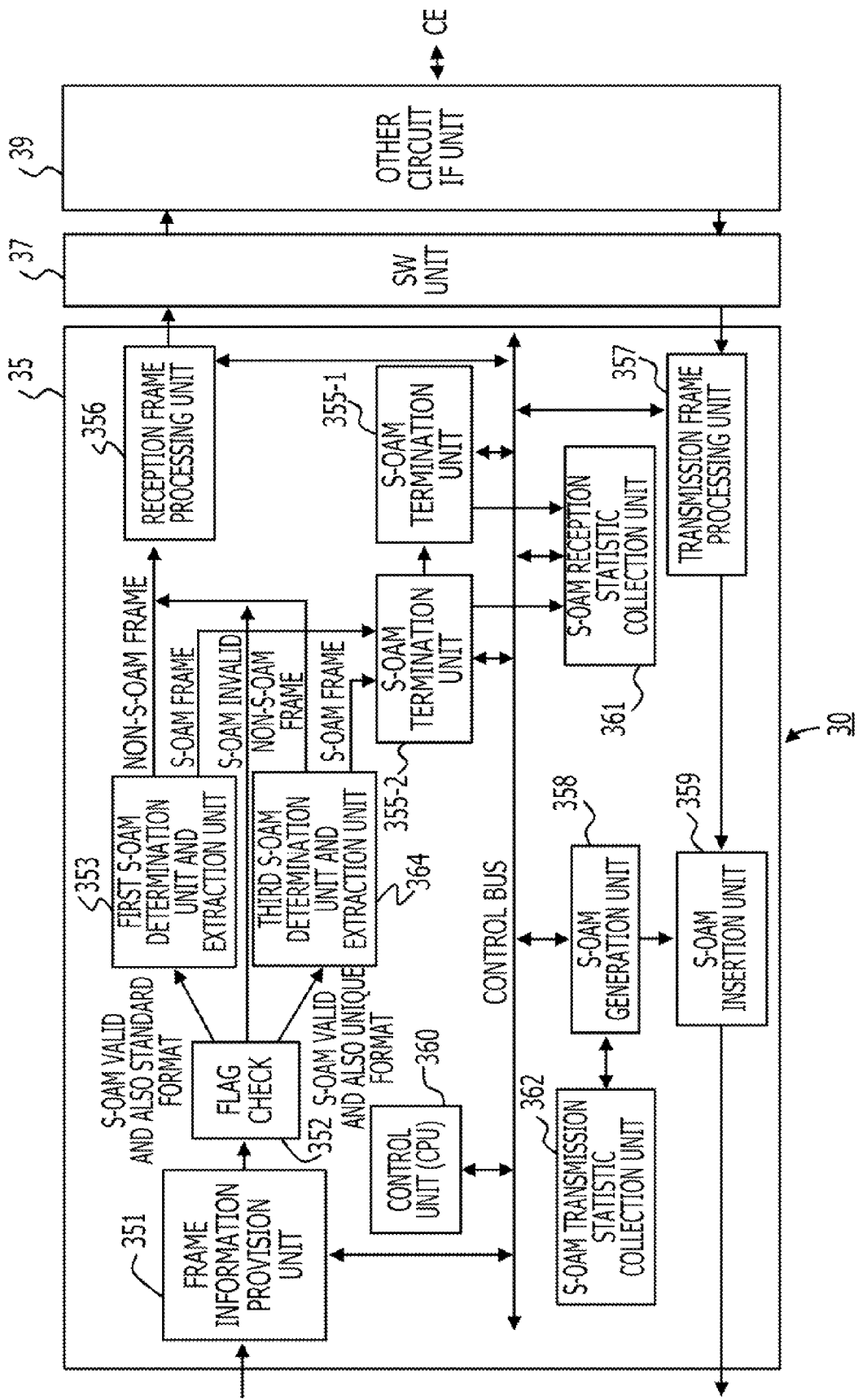

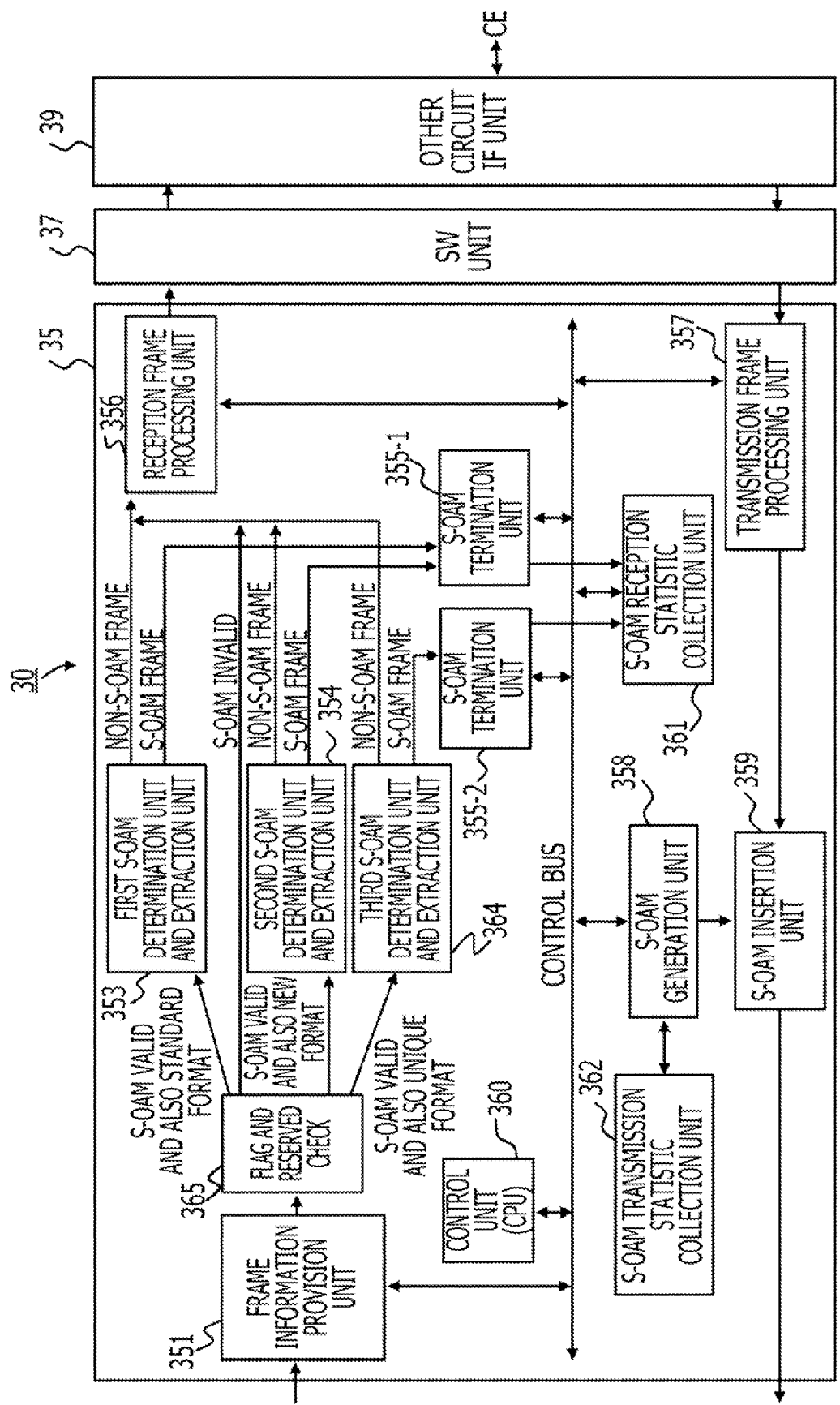

FIG. 18

| I-TAG VLAN ID (INDEX) | ENTRY VALID FLAG | S-OAM VALID FLAG | S-OAM FRAME FORMAT FLAG | S-OAM E-TYPE VALUE | CCM VALID FLAG | LB VALID FLAG | NUMBER OF VLAN STAGES |
|---|---|---|---|---|---|---|---|
| 100 | 1 | 0 | 0 | 0x0000 | 1 | 0 | 0 |
| 101 | 1 | 1 | 0 | 0xAAAA | 1 | 0 | 0 |
| 102 | 1 | 1 | 1 | 0xAAAA | 1 | 1 | 2 |
| ... | | | | ... | | | |

| I-TAG VLAN ID | S-OAM VALID | S-OAM FRAME FORMAT FLAG | S-OAM E-TYPE VALUE | ... | CCM VALID | CCM CYCLE | LB VALID | NUMBER OF USER VLAN STAGES |
|---|---|---|---|---|---|---|---|---|
| 100 | INVALID | 0 | NOT RELEVANT | ... | INVALID | INVALID | INVALID | 0 |
| 101 | VALID | STANDARD FORMAT | 0xAAAA | ... | VALID | 3.3ms | VALID | 1 |
| 200 | VALID | NEW FORMAT | 0xAAAA | ... | VALID | 10ms | INVALID | 2 |
| 201 | INVALID | 0 | NOT RELEVANT | ... | INVALID | INVALID | INVALID | 2 |

3571

COMMUNICATION APPARATUS AND METHOD IN A COMMUNICATION NETWORK SYSTEM

CROSS-REFERENCE TO RELATED APPLICATIONS

This application is based upon and claims the benefit of priority of the prior Japanese Patent Application No. 2009-194391, filed on Aug. 25, 2009, the entire contents of which are incorporated herein by reference.

FIELD

The embodiments discussed herein are related to a communication network system, a communication apparatus, and a communication method in a communication network system.

BACKGROUND

Currently, as a maintenance management function in a communication network system such as Ethernet ®, OAM (Operation Administration Management) is proposed, and its standardization is advanced by ITU-T Recommendation Y.1731 and the like. For example, a communication node and the like can monitor a particular communication segment by transmitting and receiving an OAM-dedicated message.

In addition, Ethernet ®, IEEE 802.1ah, and IEEE 802.Qay, and the like also disclose a technology called PBB (Provider Backbone Bridge). For example, the PBB is a technology for capsulating a user MAC (Media Access Control) frame of a customer (user) network in a provider MAC frame of a provider (carrier) network (hereinafter, which will be referred to as PBB frame). The PBB can realize an extension of a VLAN ID.

FIGS. 21A-D show a format example of the PBB frame containing the customer MAC frame.

As illustrated in FIG. 21B, the PBB frame capsulates the customer MAC frame in a new MAC frame. For example, "B-MAC DA" and "B-MAC SA" are MAC addresses used in the PBB network, and "B-TAG" is a VLAN tag used in the PBB network. Also, "I-TAG" is a VLAN tag used in an edge node of the PBB network. Then, whereas a VLAN-ID in the "B-TAG" has 12 bits, a VLAN-ID in the "I-TAG" has 24 bits, and the VLAN-ID is extended.

FIG. 22 shows a format example of the PBB frame containing CCM (Continuous Check Message) of S-OAM (Service-OAM) (hereinafter, which will be referred to as S-OAM frame). For example, the S-OAM frame is used between the edge nodes of the PBB network, and while the edge node periodically transmits and receives the S-OAM frame, a reception interruption or the like in a particular communication segment in the PBB network is detected.

Japanese Laid-open Patent Publication No. 2008-167331 discloses the following technology.

For example, a first layer2-network apparatus further adds an OuterOAM header to an Ethernet OAM frame that should be transmitted to a second layer2-network apparatus via the network for transmission. Then, the second layer2-network apparatus removes the OuterOAM frame from the OAM frame received from the first layer2-network apparatus for transmission.

SUMMARY

According to an aspect of the invention, a communication apparatus includes a reception unit configured to, receive a first frame having a first format and a second frame having a second format in which information is reduced with respect to the first format and extract a first identifier existing in both the first frame and the second frame; a first frame processing unit configured to process the first frame; a second frame processing unit configured to process the second frame; a table including a correspondence between the first identifier and a second identifier indicating whether the first frame and the second frame having the first identifier is in the first format or the second format; and a control unit configured to transfer the first frame or the second frame to one of the first frame processing unit and the second frame processing unit based on the table when the frame is received.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 shows an example of a frame information table;
FIG. 7 shows a processing example of a flag check unit;
FIG. 9 shows an example of the frame information table;
FIG. 10 shows an example of the frame information table;
FIG. 13A shows an example of a Flag format;
FIG. 13B shows an example of a Period value;
FIG. 14 shows a configuration example of the PE node;
FIG. 15 shows a configuration example of the PE node;
FIG. 18 shows an example of the frame information table;
FIG. 20 shows an example of the frame information table.

DESCRIPTION OF EMBODIMENTS

Figure 22:
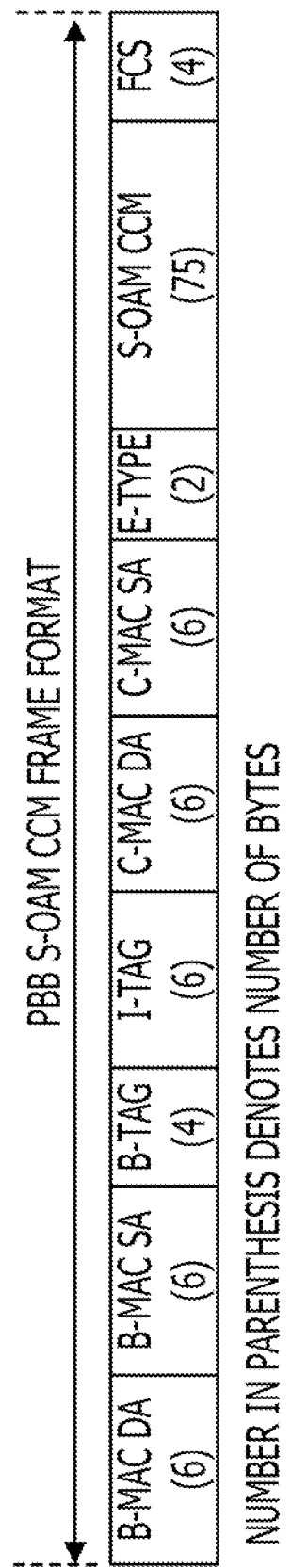
FIG. 22 shows a format example of the PBB frame including the CCM message.

The S-OAM frame in Related Art (for example, FIG. 22) is used for monitoring a state of the PBB network or the like and is not transmitted or received between customer terminals or customer nodes. On the other hand, the S-OAM frame has an area for containing MAC addresses corresponding to the customer terminals or the like (for example, "C-MAC DA", "C-MAC SA"). For this reason, the data amount is also larger in the S-OAM frame by the relevant area. Thus, the edge node of the PBB network takes time for carrying out a processing on the S-OAM frame by the relevant area and further takes time for detecting a failure in the communication segment.

Also, according to the technology disclosed in Japanese Laid-open Patent Publication No. 2008-167331, the OuterOAM header is added to the Ethernet OAM frame, and the data transfer amount is increased by the headers added between the layer2-network apparatuses.

Then, frames of mutually different formats may also be transmitted and received between the edge nodes of the PBB network, and in this case, a problem occurs in which a mutual connection cannot be established between the edge nodes.

Embodiments for carrying out the present embodiments will be described below.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 1:
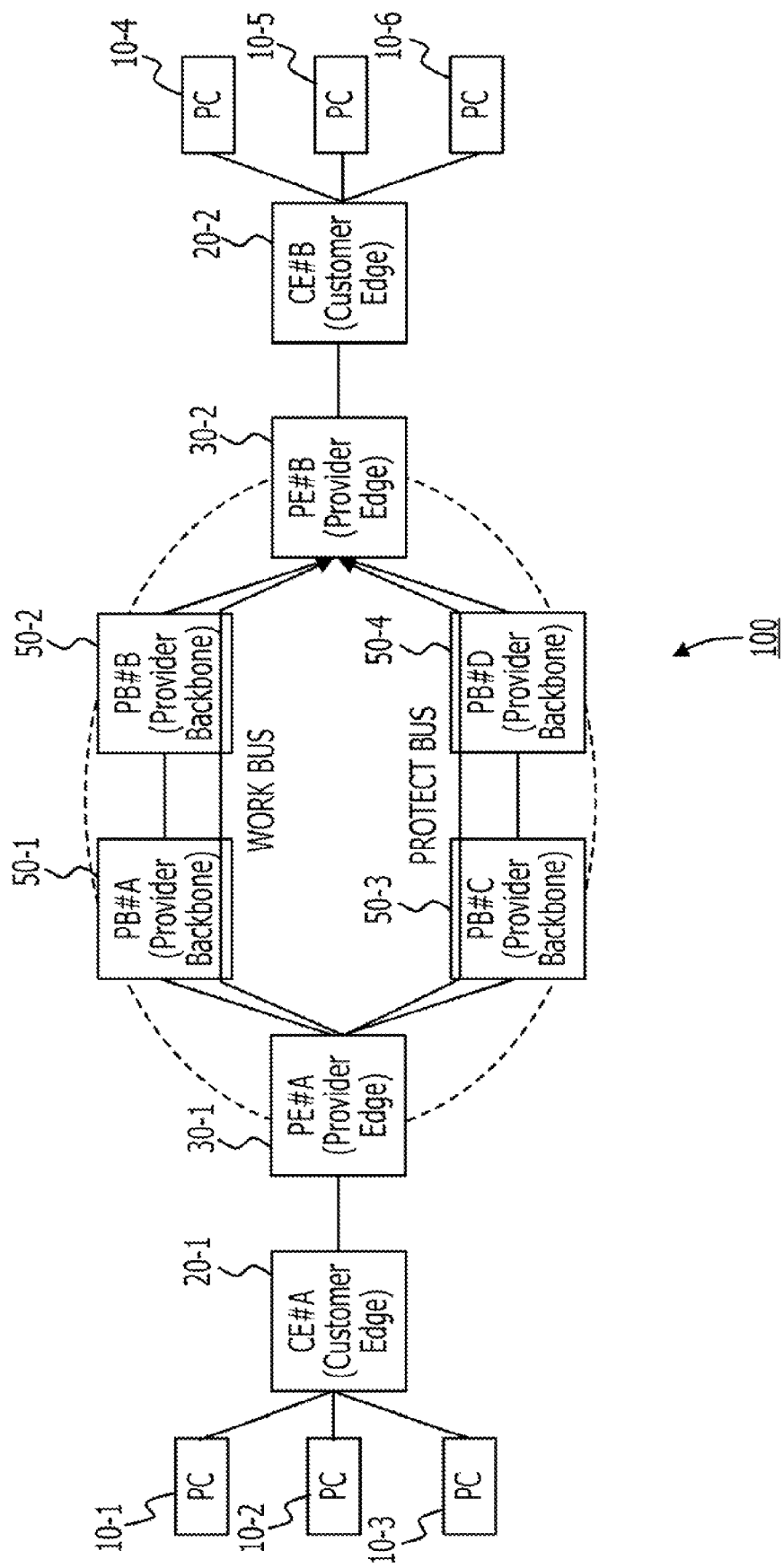
FIG. 1 shows a configuration example of a communication network system.

FIG. 1 shows a configuration example of a communication network system 100. The communication network system 100 includes personal computers (hereinafter, which will be referred to as "PC") 10-1 to 10-6, customer edge nodes (hereinafter, which will be referred to as "CE node") 20-1 and 20-2, provider edge nodes (hereinafter, which will be referred to as "PE node") 30-1 and 30-2, and provider backbone nodes (hereinafter, which will be referred to as "PB node") 50-1 to 50-4.

The PCs 10-1 to 10-6 are customer (or user) terminals and arranged in a customer network. The PCs 10-1 to 10-6 transmit and receive, for example, a customer (or user) MAC frame.

The CE nodes 20-1 and 20-2 are communication nodes (or communication apparatuses) arranged in the customer network and adapted to function as a border of the customer network with a provider (or carrier) network (hereinafter, which will be referred to as "PBB network") side.

The PE nodes 30-1 and 30-2 are communication nodes (or communication apparatuses) arranged in the PBB network and adapted to function as a border with the customer network. The PE nodes 30-1 and 30-2 encapsulate the user MAC frame transmitted from the CE nodes 20-1 and 20-2 to generate the PBB frame to be transmitted to the PB nodes 50-1 to 50-4. Also, the PE nodes 30-1 and 30-2 decapsulate the PBB frame to obtain the user MAC frame by terminating the PBB frame transmitted from the PB nodes 50-1 to 50-4 or through decapsulating or the like and transmit the relevant frame to the CE nodes 20-1 and 20-2. A detail of which will be described below.

The PB nodes 50-1 to 50-4 are relay nodes (or relay apparatuses) arranged on a core side in the PBB network and adapted to relay the PBB frame while following values stored in the respective areas of "B-MAC" and "B-TAG" of the PBB frame.

It should be noted that the communication network system 100 shown in FIG. 1 shows an example in which two paths (a Work path and a Protect path via a Work Bus and Protect Bus, respectively) are set between the PE nodes 30-1 and 30-2. For example, the transfer of the PBB frame is performed in one of the paths. Also, the PBB frame containing the CCM message of the S-OAM (hereinafter, which will be referred to as "S-OAM frame" if not otherwise specified) is periodically transmitted and received over each path between the PE nodes 30-1 and 30-2, and a normality of the paths is monitored. For example, when a failure of the Work path is detected through the transmission and reception of the PBB frame containing the CCM message of the S-OAM, the PE nodes 30-1 and 30-2 perform a communication switch to the Protect path.

In the communication network system 100, a PBB network includes, for example, the PE nodes 30-1 and 30-2 and PB nodes 50-1 to 50-4.

Figure 2:
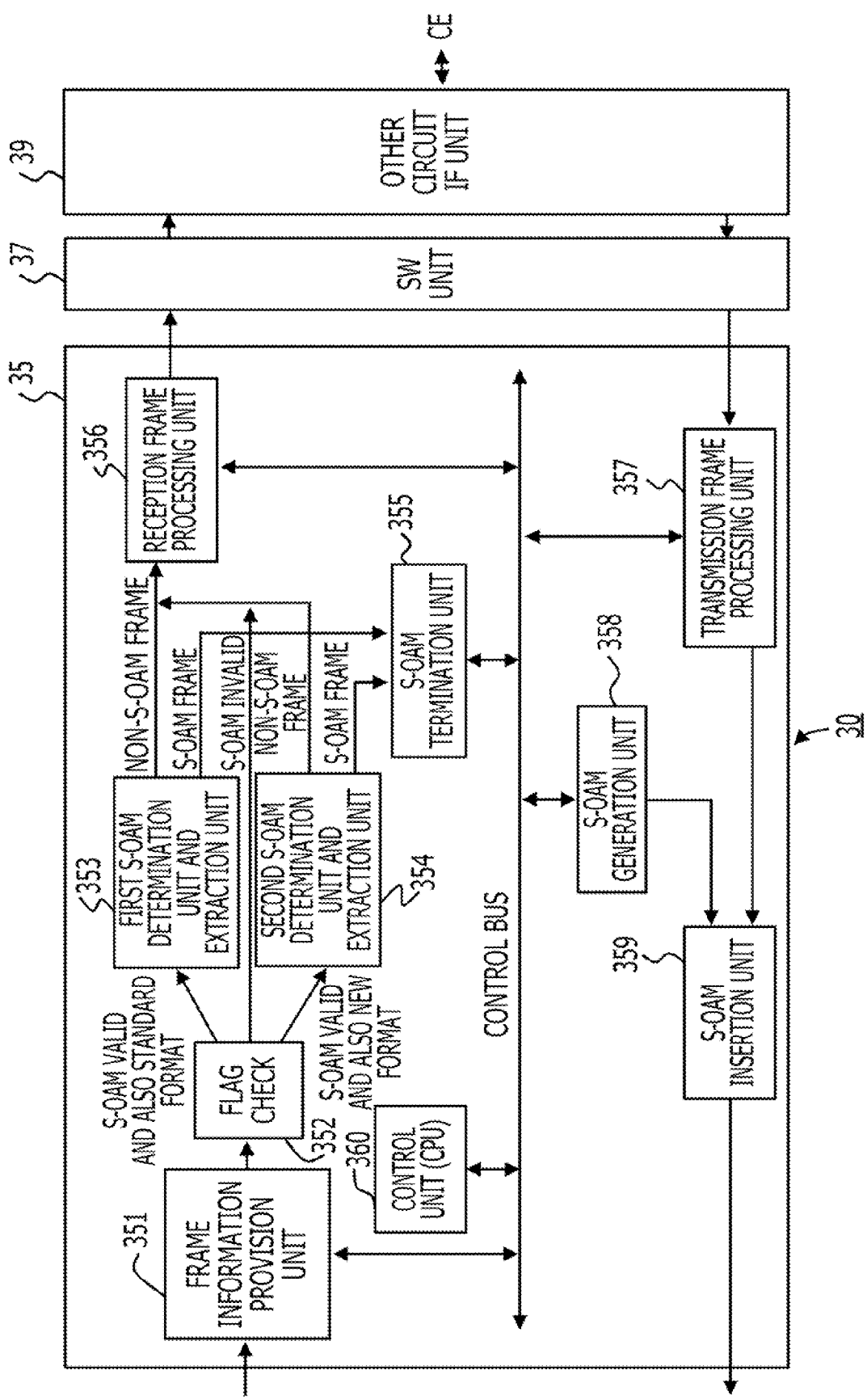
FIG. 2 shows a configuration example of a PE node.

FIG. 2 shows a configuration example of the PE node 30. The PE node 30 includes a circuit interface unit 35, a switch (hereinafter, which will be referred to as SW) unit 37, and another circuit interface unit 39.

The circuit interface unit 35 is, for example, an interface connected to the PBB network side and adapted to contain an Ethernet circuit and perform various transmission and reception processings such as generation of an S-OAM frame.

The circuit interface unit 35 includes a frame information provision unit 351, a flag check unit 352, the first S-OAM determination and extraction unit (hereinafter, which will be referred to as "first S-OAM extraction unit") 353, a second S-OAM determination and extraction unit (hereinafter, which will be referred to as "second S-OAM extraction unit") 354, an S-OAM termination unit 355, a reception frame processing unit 356, a transmission frame processing unit 357, an S-OAM generation unit 358, an S-OAM insertion unit 359, and a control unit (CPU) 360.

The frame information provision unit 351 receives the PBB frame from the PBB network, outputs the relevant PBB frame to the flag check unit 352, and further outputs various pieces of frame information for determining whether or not the PBB frame is the S-OAM frame and the like to the flag check unit 352. The frame information provision unit 351 includes a frame information table therein and extracts and outputs frame information from the frame information table on the basis of the "I-TAG VLAN ID" in the PBB frame. A detail of the frame information table will be described below.

The flag check unit 352 determines a validity of the S-OAM frame, a format of the S-OAM frame, and the like on the basis of the frame information. The flag check unit 352 outputs the PBB frame to the reception frame processing unit 356, the first S-OAM extraction unit 353, or the second S-OAM extraction unit 354 on the basis of the determination result. A detail of the determination and the like will be described below.

The first S-OAM extraction unit 353 determines whether or not the PBB frame in the standard format is the S-OAM frame (or whether or not the PBB frame contains the S-OAM message) on the basis of the frame information or the like. In accordance with the determination result, the first S-OAM extraction unit 353 extracts the S-OAM message from the PBB frame and outputs the relevant message to the S-OAM termination unit 355. Also, the first S-OAM extraction unit 353 outputs a PBB frame other than the S-OAM frame (hereinafter, which will be referred to as non-S-OAM frame) to the reception frame processing unit 356. A detail of the determination and the like will be described below.

The second S-OAM extraction unit 354 determines whether or not the PBB frame in a new format is the S-OAM frame on the basis of the frame information or the like. Similarly as in the first S-OAM extraction unit 354, on the basis of the determination result, the second S-OAM extraction unit 354 outputs the S-OAM message to the S-OAM termination unit 355 or outputs the non-S-OAM frame to the reception frame processing unit 356. A detail of the determination and the like will be described below.

The S-OAM termination unit 355 performs a content check on the S-OAM messages output from the first and second S-OAM extraction units 353 and 354, a check as to whether or not the reception is made within a reception cycle, and the like and terminates the relevant message.

The reception frame processing unit 356 performs a processing such as a content check on the non-S-OAM frames output from the first and second S-OAM extraction units 353 and 354 and a determination of a transfer destination and outputs the non-S-OAM frame to the SW unit 37.

For example, with respect to the user MAC frame output from the SW unit 37, the transmission frame processing unit 357 capsulates the relevant frame to generate the PBB frame and further performs a transmission determination on the transmission frame or the like.

The S-OAM generation unit 358 generates the S-OAM frame to be output to the S-OAM insertion unit 359 in a set cycle (for example, 3.3 ms). The S-OAM generation unit 358 includes, for example, a memory or the like therein and reads out the S-OAM frame stored in the memory in the set cycle to be output to the S-OAM insertion unit 359.

The S-OAM insertion unit 359 performs statistical multiplexing on the PBB frame (the non-S-OAM frame) output from the transmission frame processing unit 357 and the S-OAM frame output from the S-OAM generation unit 358 to be transmitted to the PBB network.

The SW unit 37 is connected to another processing unit or the other circuit interface unit 39 and adapted to perform, for example, a switching processing on the user MAC frame.

The other circuit interface unit 39 has, for example, the same configuration as the circuit interface unit 35 and is connected to the CE nodes 20-1 and 20-2.

Next, an operation will be described.

Figure 3:
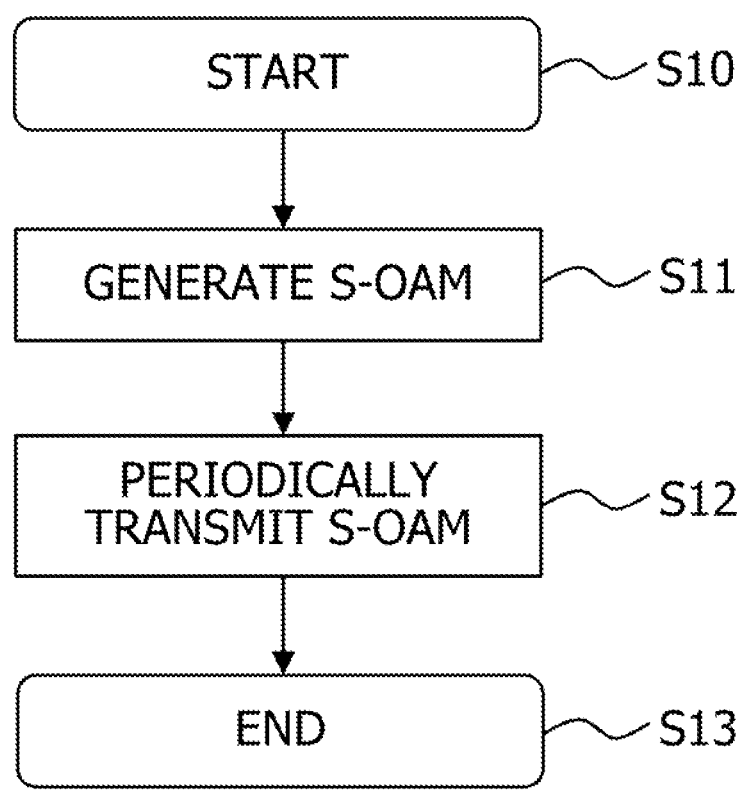
FIG. 3 is a flow chart showing an operation example.

FIG. 3 is a flow chart showing an operation example on the transmission side in the PE node 30.

When the processing is started (S10), the PE node 30 generates the S-OAM frame (S11). For example, the S-OAM generation unit 358 generates the S-OAM frame to be stored in the memory.

According to the present embodiment, the PE node 30 can transmit the S-OAM frame in the standard format and the S-OAM frame in the new format whose data amount is smaller than the standard format and also can receive those.

Figure 5A:
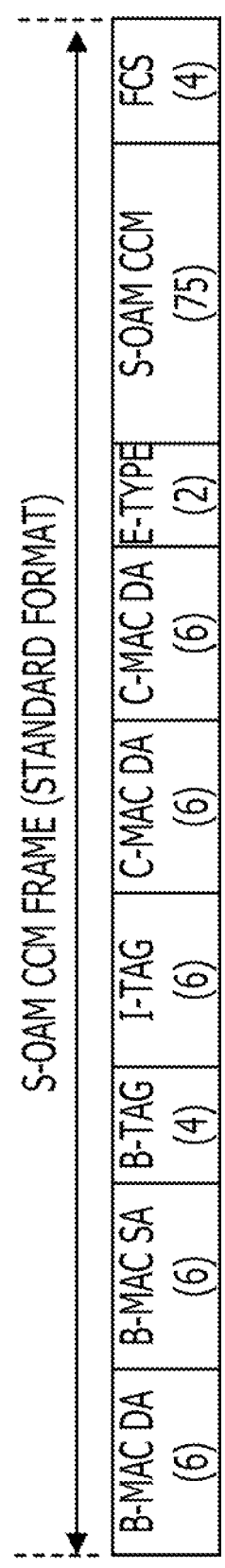
FIG. 5A shows a frame format example of an S-OAM.

FIG. 5A shows a format example of the S-OAM frame in the standard format.

Figure 5B:
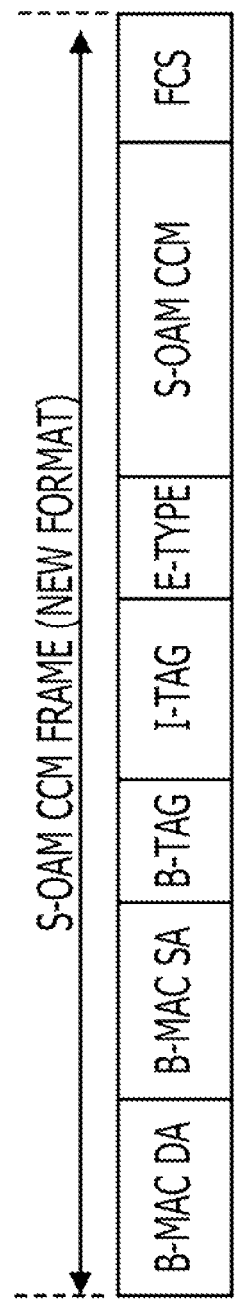
FIG. 5B shows a frame format example of the S-OAM.

FIG. 5B shows a format example of the S-OAM frame in the new format.

As to the S-OAM frame in the new format, the respective areas of "C-MAC DA" and "C-MAC SA" are deleted as compared with the standard format. The "C-MAC DA" and the like are customer (user) MAC addresses and, for example, are address information related to the PCs 10-1 to 10-6 outside the PBB network. Even when the areas such as "C-MAC DA" are deleted from the S-OAM frame in the standard format, the PBB frame is not transmitted to the PCs 10-1 to 10-6, the CE nodes 20-1 and 20-2, and the like which are outside the PBB network, and therefore it is possible to perform the state monitoring in the PBB network.

Next, the PE node 30 periodically transmits the generated S-OAM frame to the PBB network (S12). For example, the S-OAM generation unit 358 periodically transmits the S-OAM frame. For example, in accordance with which one of the two types of the S-OAM frames in the standard format and the new format the opposite edge node (PE node) supports, the S-OAM generation unit 358 can also output the previously decided S-OAM frame.

Then, the PE node 30 ends the transmission processing (S13).

Figure 4:
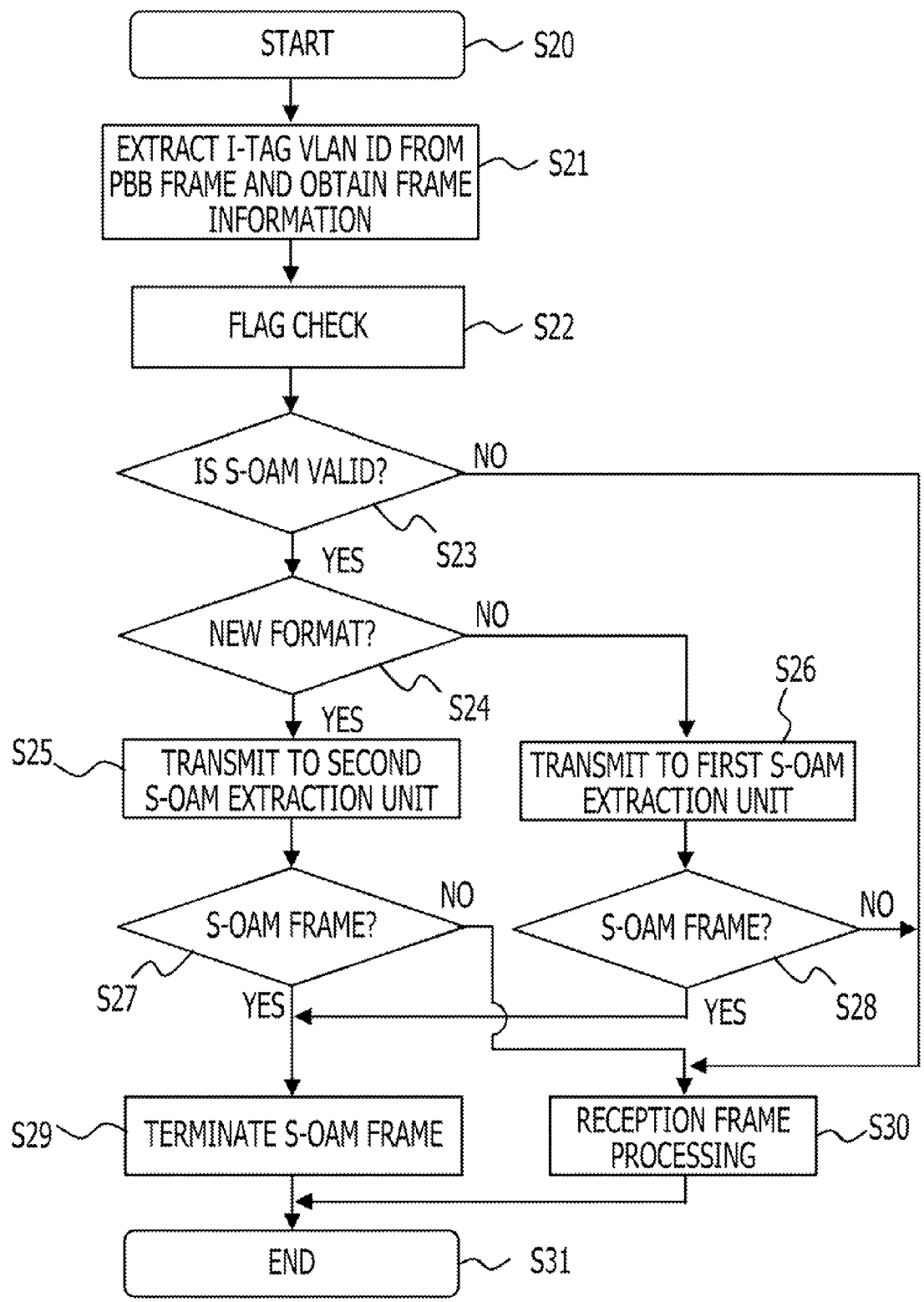
FIG. 4 is a flow chart showing an operation example.

FIG. 4 is a flow chart showing an operation example of the PE node 30 on the reception side. When the processing is started (S20), the PE node 30 extracts the VLAN ID stored in the "VLAN ID" area of the "I-TAG" area in the received PBB frame (hereinafter, which will be referred to as "I-TAG VLAN ID") and obtains frame information (S21). For example, the frame information provision unit 351 extracts the "I-TAG VLAN ID" and obtains the frame information from a frame information table 3510 on the basis of the relevant ID.

FIG. 6 shows an example of the frame information table 3510. The frame information table 3510 includes the respective areas of "entry valid flag", "S-OAM valid flag", "S-OAM frame format flag", and "S-OAM E-TYPE value" while the "I-TAG VLAN ID" is used as an index (key).

The "entry valid flag" stores a flag indicating whether or not the entry of the present table 3510 accessed with the "I-TAG VLAN ID" is valid and, for example, "1" indicates the valid entry, and "0" indicates the invalid entry.

The "S-OAM valid flag" is a flag indicating whether or not the S-OAM for the I-TAG VLAN ID is supported between the PBB edge nodes (the PE nodes 30-1 and 30-2). For example, "1" indicates the valid support, and "0" indicates the invalid support.

The "S-OAM frame format flag" is a flag indicating whether the S-OAM frame for the I-TAG VLAN ID is in a standard format (for example, FIG. 5A) or a new format (for example, FIG. 5B) and, for example, "1" indicates the new format, and "0" indicates the standard format.

The "S-OAM E-TYPE value" stores "E-TYPE" value indicating a type of the S-OAM frame for the I-TAG VLAN ID.

Then, the frame information table 3510 includes the "I-TAG VLAN ID" area, and by using this "I-TAG VLAN ID" as an index (key), the frame information table 3510 is searched for.

For example, the frame information provision unit 351 extracts the "I-TAG VLAN ID" included in the received PBB frame and by using the relevant ID as the index, reads the corresponding various pieces of frame information such as the "entry valid flag" from the frame information table 3510. The frame information provision unit 351 outputs the PBB frame and the frame information to the flag check unit 352.

Next, the PE node 30 performs the flag check on the received PBB node (FIG. 4, S22). For example, the flag check unit 352 performs this processing.

FIG. 7 shows a processing content example in the flag check unit 352. The flag check unit 352 stores, for example, a table shown in FIG. 7, and a subsequent processing is performed on the basis of the relevant table.

Next, the PE node 30 determines whether or not the "S-OAM valid flag" is valid (FIG. 4, S23). For example, the flag check unit 352 performs the determination on the basis of the "S-OAM valid flag" among the frame information.

When the "S-OAM valid flag" is valid (FIG. 4, S23: Yes), the PE node 30 determines whether the received PBB frame is in the new format or the standard format (FIG. 4, S24). For example, the flag check unit 352 performs the determination on the basis of the "S-OAM frame format flag". For example, the flag check unit 352 determines the new format when the "S-OAM format flag" is "1" and the standard format when the "S-OAM format flag" is "0".

On the other hand, when the "S-OAM valid flag" is invalid (FIG. 4, S23: No), the PE node 30 outputs the received PBB frame to the reception frame processing unit 356 (FIG. 4, S30).

Next, when the PBB frame is in the new format (FIG. 4, S24: Yes), the PE node 30 outputs the received PBB frame to the second S-OAM extraction unit 354 (FIG. 4, S25). For example, the flag check unit 352 outputs the PBB frame determined as the new format and the "S-OAM E-TYPE value" among the frame information to the second S-OAM extraction unit 354.

On the other hand, when the PBB frame is in the standard format (FIG. 4, S24: No), the PE node 30 outputs the received PBB frame to the first S-OAM extraction unit 353 (FIG. 4, S26). For example, the flag check unit 352 outputs the PBB frame determined as the standard format and the "S-OAM E-TYPE value" to the first S-OAM extraction unit 353.

Next, the PE node 30 determines whether or not the received PBB frame is the S-OAM frame (FIG. 4, S27, S28). For example, the second S-OAM extraction unit 354 compares the "S-OAM E-TYPE value" of the frame information with the value stored in the "E-TYPE" area of the received PBB frame and determines the S-OAM frame when the "S-OAM E-TYPE value" is matched with the value and the non-S-OAM frame when the "S-OAM E-TYPE value" is not matched with the value.

The frame information table 3510 stores the "S-OAM E-TYPE value" while corresponding to the value of the "I-TAG VLAN ID". When this E-TYPE value is the value indicating the S-OAM frame (for example, "0xAAAA") and is also matched with the E-TYPE value stored in the PBB frame, the second S-OAM extraction unit 354 can determine that the received PBB frame is the S-OAM frame. On the other hand, when the E-TYPE value stored in the PBB frame is a value other than the S-OAM frame (for example, non "0xAAAA"), the E-TYPE value is not matched with the E-TYPE value indicating the S-OAM. In such a case, the second S-OAM extraction unit 354 can determine the non-S-OAM frame. The first S-OAM extraction unit 353 also performs a similar determination.

When it is determined that the PBB frame is the S-OAM frame (FIGS. 4, S27 and S28: Yes), the PE node 30 checks the content of the S-OAM frame and terminates the relevant frame (FIG. 4, S29). For example, the first or second S-OAM extraction unit 353 or 354 outputs the S-OAM frame to the S-OAM termination unit 355, and the S-OAM termination unit 355 performs a check on the frame content or the like and terminates the relevant frame.

On the other hand, when it is determined that the PBB frame is the non-S-OAM frame (FIGS. 4, S27 and S28: No), the PE node 30 performs a reception frame processing on the non-S-OAM frame (FIG. 4, S30). For example, the first or second S-OAM extraction unit 353 or 354 outputs the non-S-OAM frame to the reception frame processing unit 356.

Then, the PE node 30 ends the series of processings (FIG. 4, S31).

In this manner according to the present first embodiment, the present communication network system 100 transmits the S-OAM frame in the new format whose data amount is smaller as compared with the S-OAM frame in the standard format to the PBB network. Therefore, the present communication network system 100 can decrease the data amount transferred to the network as compared with the case of the standard format.

Also, the present PE node 30 can receive the two types of frames of the standard format and the new format with regard to the S-OAM frame. Therefore, for example, even when the PE node 30-1 opposite to the PE node 30-2 only supports the standard format, the PE node 30-2 can perform the processing through the connection with the PE node 30-1. Also, even when the PE node 30-1 opposite to the PE node 30-2 is a PE node which supports the standard format and the new format, the connection can be established.

A second embodiment is an example of a case in which a user VLAN ID is assigned to the S-OAM frame or the like. It should be noted that the configuration example of the PE node 30 and the like are similar to those of the first embodiment.

Figure 8A:
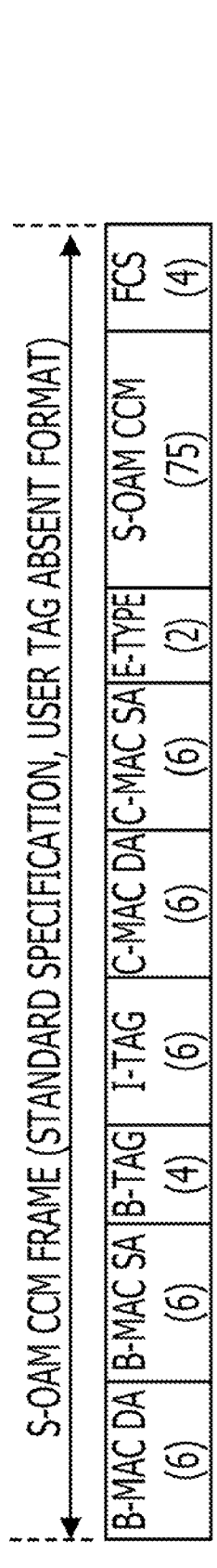
FIG. 8A shows a frame format example of an S-OAM CCM.

FIG. 8A shows a frame format example of the S-OAM frame in the standard format.

Figure 8B:
FIG. 8B shows a frame format example of the S-OAM CCM.
Figure 8C:
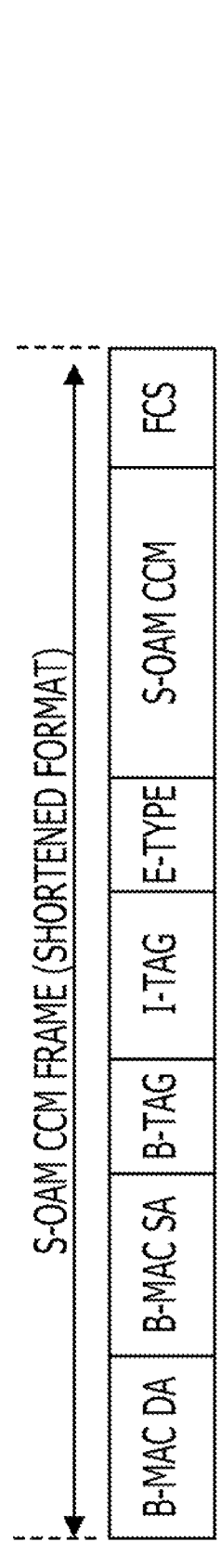
FIG. 8C shows a frame format example of the S-OAM CCM.

FIG. 8C shows a frame format example of the S-OAM frame in the new format.

FIG. 8B shows a frame format example of the S-OAM frame in a case where a user tag is present.

The S-OAM frame shown in FIG. 8B has two user tags of "TAG-1" and "TAG2", and an example is illustrated in which the user (or customer) network is separated into two networks. The present second embodiment is an example in which the VLAN tag is included in the user frame.

The first S-OAM extraction unit 353 of the PE node 30 uses the value stored in the "E-TYPE" area in the PBB frame for the determination of whether this is the S-OAM. According to the first embodiment, the first S-OAM extraction unit 353 can read out the value stored in the "E-TYPE" area by accessing a position by a previously decided byte length from the beginning of the PBB frame.

On the other hand, in a case where a plurality of user tags are assigned to the PBB frame in the standard format, in order to read out the value of the "E-TYPE" area, the first S-OAM extraction unit 353 checks the number of stages of the assigned user tags.

In view of the above, according to the present second embodiment, for example, the "number of VLAN stages" indicating the number of stages of the assigned user tags is stored in the frame information table 3510. Then, the first S-OAM extraction unit 353 obtains the position of the "E-TYPE" area on the basis of the "number of stages of assigned user tags" among the frame information to read out the value of the "E-TYPE" area and determines whether or not this is the S-OAM frame (FIG. 4, S28).

FIG. 9 shows an example of the frame information table 3510 according to the present second embodiment. The frame information table 3510 further has an area of the "number of VLAN stages", and a value indicating the "number of VLAN stages" is stored.

On the basis of the "I-TAG VLAN ID" of the reception PBB frame, the frame information provision unit 351 reads the "number of VLAN stages" of the frame information table 3510. The frame information provision unit 351 outputs the "number of VLAN stages" via the flag check unit 352 to the first S-OAM extraction unit 353 (FIG. 4, S21).

On the basis of the "number of VLAN stages", the first S-OAM extraction unit 353 obtains a position of the "E-TYPE" area in the frame to read out the value of "E-TYPE" and determines whether or not the reception PBB frame is the S-OAM frame (FIG. 4, S28). The subsequent processing is similar to that of the first embodiment.

Also, for example, the S-OAM generation unit 358 holds the S-OAM frames in three formats and can, for example, periodically transmit the S-OAM frame in one of the three formats to the PBB network (FIGS. 3, S11 to S12).

According to the present second embodiment, the PE node 30 can perform the processing in a case where the user tag is present or also in a case where the user tag is absent, and it is possible to perform the processing even in a case where the opposite PE node in which the PBB frame has the user tag is transmitted. Also, similarly as in the first embodiment, the PE node 30 can transmit and receive the S-OAM frame in the new format, and therefore the frame length can be shortened as compared with the S-OAM in the standard format having the user tag, and it is possible to decrease the data amount transferred to the communication network.

Figure 21:
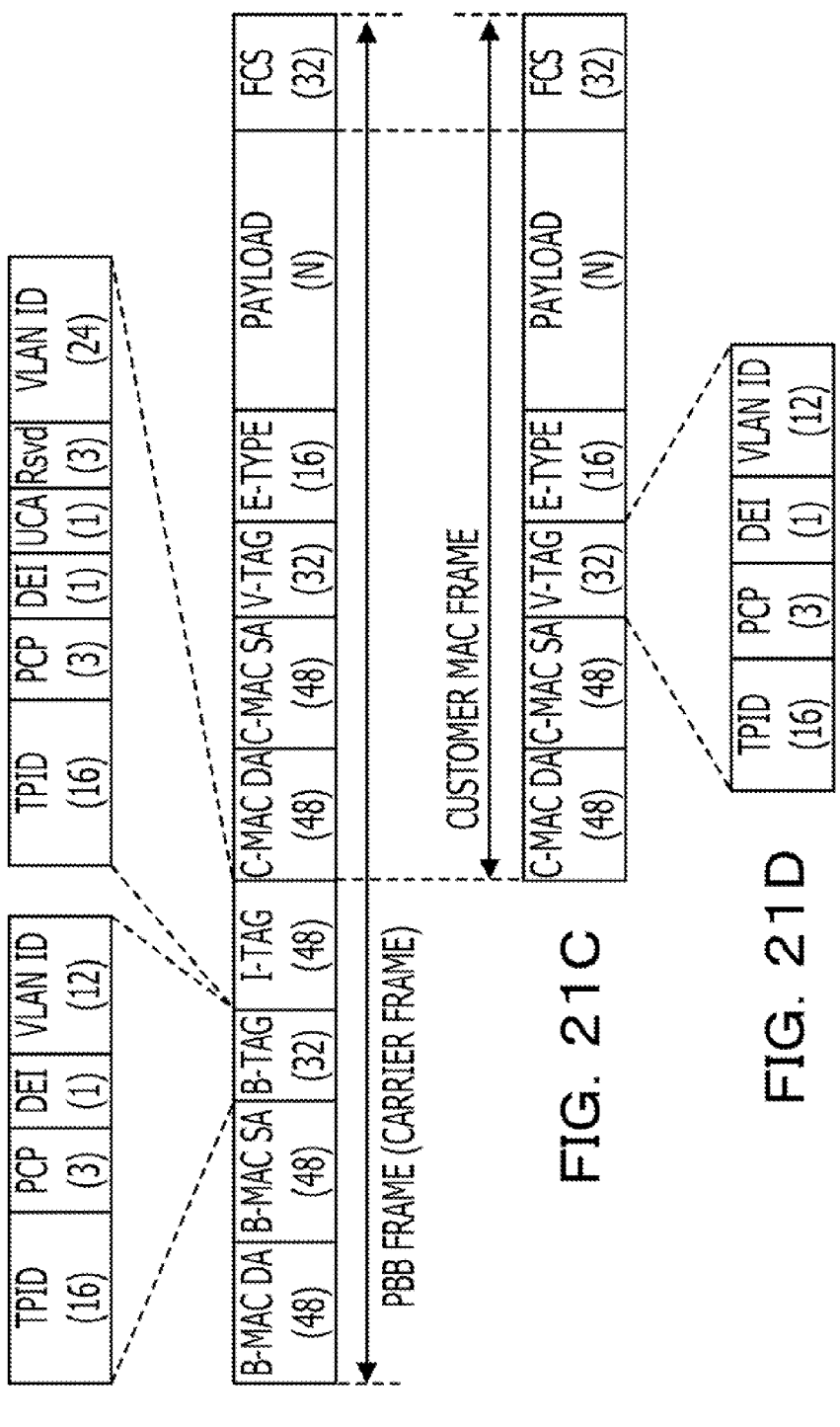
FIGS. 21A, 21B, 21C and 21D show an example of a format example of the PBB frame.

A third embodiment is an example in which for the determination as to whether the PBB frame is in the new format or the standard format, "Reserved" area in the "I-TAG" area of the PBB frame (for example, "Rsvd" area in FIG. 21A) is used.

The "Reserved" area stores "000" of three bits as unused bits in, for example, IEEE standard specification (IEEE802.1ah or the like). According to the present third embodiment, in a case where the S-OAM frame in the new format is used, the previously decided bits are stored in this "Reserved" area to determine whether or not this is the S-OAM frame in the new format.

FIG. 10 shows an example of the frame information table 3510 used in the present third embodiment. In the frame information table 3510 of FIG. 10, in order to determine whether this is the new format or the standard format on the basis of the "Reserved" area, the "S-OAM frame format flag" area in FIG. 6 is deleted. The configuration example of the PE node 30 and the like are similar to those of the first embodiment.

With regard to the S-OAM frame in the new format, the S-OAM generation unit 358 of the PE node 30 stores appropriate bits (or bit pattern) in the "Reserved" area of the I-TAG to be output to the S-OAM insertion unit 359 (FIGS. 3, S11 to S12).

The flag check unit 352 of the PE node 30 checks the value (bit pattern) stored in the "Reserved" area of the received PBB frame and determines that the received PBB frame is in the new format when the relevant value is a value indicating the S-OAM frame in the new format (FIG. 4, S24). The subsequent processing is similar to that of the first embodiment.

According to the present third embodiment, as the frame information table 3510 does not have the "S-OAM frame format flag" area, it is possible to decrease the memory area as compared with the first embodiment and the like. Also, in the frame information table 3510, the setting value of the "S-OAM frame format flag" is not stored for each "VLAN ID", and it is possible to further reduce the processing as compared with the first embodiment.

A fourth embodiment is an example in which the number of transmissions or receptions of the S-OAM frames is counted to calculate the data transfer amount.

Figure 11:
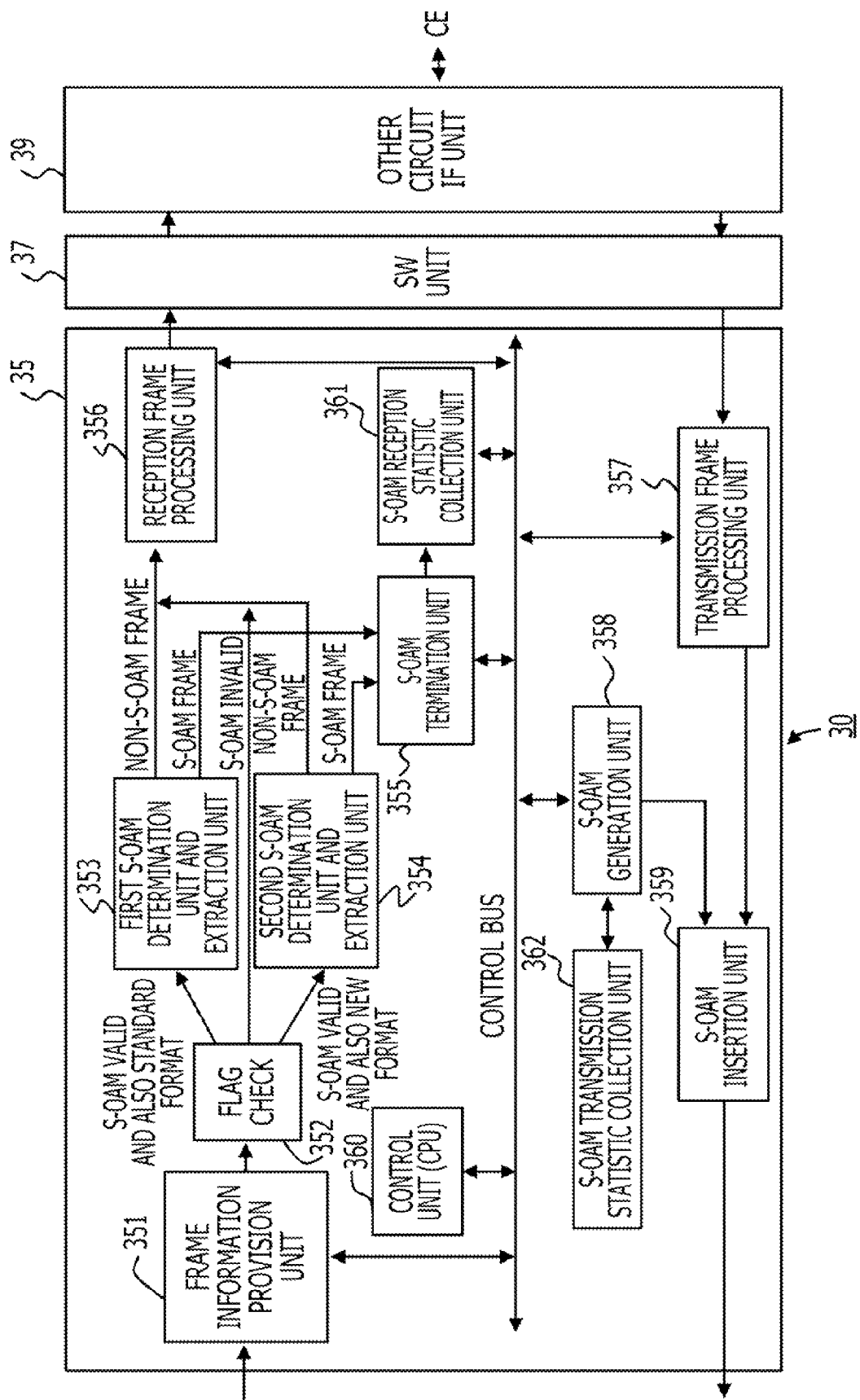
FIG. 11 shows a configuration example of the PE node.

FIG. 11 shows a configuration example of the PE node 30 according to the present fourth embodiment.

The PE node 30 includes an S-OAM reception statistic collection unit 361 and an S-OAM transmission statistic collection unit 362.

The S-OAM reception statistic collection unit 361 counts the number of the S-OAM frames terminated by the S-OAM termination unit 355 for each "I-TAG VLAN ID" to add up the number of receptions of the S-OAM frames.

The S-OAM transmission statistic collection unit 362 counts the number of the S-OAM frames generated or output by the S-OAM generation unit 358 for each "I-TAG VLAN ID" to add up the number of transmissions of the S-OAM frames.

For example, the counted number of transmissions or receptions of the S-OAM frames is read out by the CPU 360 and transmitted, for example, to an external monitor (not shown) which is connected to the control bus for displaying the data reduction amount on the external monitor, and a maintenance manager or an operator of the network can be notified of the state.

The number of receptions of the S-OAM frames or the like may be calculated by the S-OAM reception statistic collection unit 361 or the like, and the CPU 360 may also perform the calculation. For example, by multiplying the reduced byte numbers per the S-OAM frame in the "I-TAG VLAN ID" unit (.e.g., "C-MAC DA", "C-MAC SA", user tag or the like) with the number of the reception frames (or the transmission frames, or both), the number of reduced bytes can be calculated.

A fifth embodiment is an example of the S-OAM frame in which a part of the CCM message is reduced.

Figure 12A:
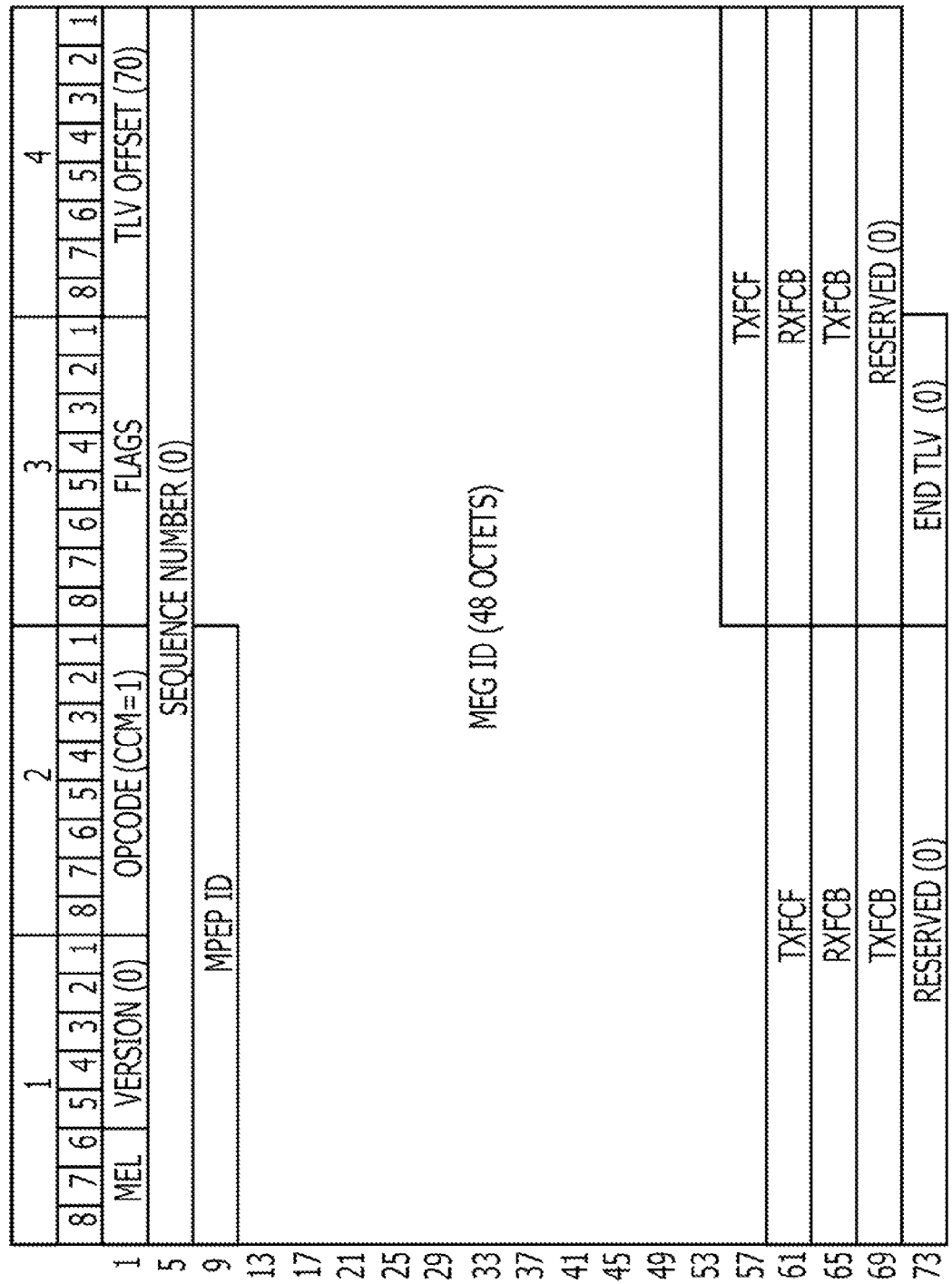
FIG. 12A shows an example of a CCM message format.

FIG. 12A shows a format example of the CCM message in the S-OAM frame (for example, in conformity to ITU-T Y.1731). The above-mentioned CCM message is, for example, a message included in the "S-OAM CCM" area of FIG. 5A.

For example, the CCM message has 75 bytes in total, and among this, "MEG ID" has 48 bytes. The "MEG ID" indicates a global ID. According to the present fifth embodiment, for example, an "MEG ID" area has 8 bytes. According to this, the S-OAM frame can reduce 40 bytes. The byte length of the "MEG ID" area is not limited to 8 bytes, and any value may take as long as the byte length can be shortened.

Figure 12B:
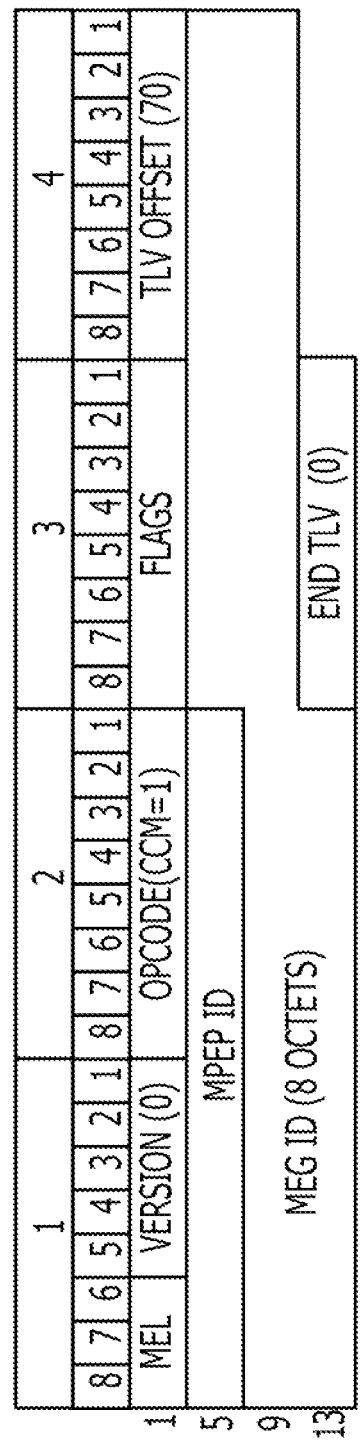
FIG. 12B shows an example of the CCM message format.

FIG. 12B shows a format example of the CCM message (hereinafter, which will be referred to as CCM message in a unique format or S-OAM frame in a unique format) according to the present fifth embodiment. The byte length of the "MEG ID" area is 8 bytes, and further, "Sequence Number" area, "TxFCf" area, "RxFCb" area, and "TxFCb" area are deleted. The CCM message in a unique format can reduce 16 bytes as compared with a case where "Sequence Number" area and the like are present. Also, when the "MEG ID" area is included, as compared with the example of FIG. 12A, it is possible to reduce 56 bytes in total.

It should be noted that in FIG. 12A, the "Sequence Number" area stores a sequence number, and currently unused and, for example, "0" is stored. The "TxFCf" area, the "RxFCb" area, and "TxFCb" area are also currently unused and, for example, "0" is stored.

FIG. 13A shows an example of a CCM Flag format included in "Flags" area of the CCM message. This CCM Flag format includes "Period" area, and in the relevant area, a value indicating a transfer cycle of the CCM message is stored. FIG. 13B shows an example of the value stored in the "Period" area (CCM Period value).

FIG. 14 shows a configuration example of the PE node 30 according to the fifth embodiment. The PE node 30 includes the third S-OAM determination and extraction unit (hereinafter, which will be referred to as third S-OAM extraction unit) 364 and first and second S-OAM termination units 355-1 and 355-2. Also, the flag check unit 352 performs the determination as to whether the PBB frame is in the standard format or the unique format.

The third S-OAM extraction unit 364 determines whether or not the frame output from the flag check unit 352 is the non-S-OAM frame or the S-OAM frame. Similarly as in the first embodiment, the third S-OAM extraction unit 364 determines the S-OAM frame when the value stored in the "E-TYPE" area is matched with the value stored in the frame information table 3510 and determines the non-S-OAM frame when the value is not matched. The third S-OAM extraction unit 364 outputs the non-S-OAM frame to the reception frame processing unit 356 and outputs the S-OAM frame to the second S-OAM termination unit 355-2.

The first and second S-OAM termination units 355-1 and 355-2 respectively perform the confirmation on the transfer cycles in the S-OAM frames in the standard format and the unique format and the like and terminate the relevant frames.

It should be noted that the flag check unit 352 determines whether the received PBB frame is in the standard format or the unique format, for example, on the basis of the "I-TAG VLAN ID". A value of the "I-TAG VLAN ID" indicating the unique format is stored in the frame information table 3510, and the flag check unit 352 determines that the received PBB frame is in the unique format when the value is matched with the "I-TAG VLAN ID" included in the received PBB frame and determines that the received PBB frame is in the standard format when the value is not matched (FIG. 4, S24). The subsequent processing is similar to that of the first embodiment.

Furthermore, the S-OAM generation unit 358 stores the S-OAM frame in the unique format or the standard format, for example, in an internal memory to be periodically output to the S-OAM insertion unit 359 (FIGS. 3, S11 to S12).

According to the present fifth embodiment, the CCM message in the S-OAM frame is shortened, and therefore as compared with the standard format with regard to the S-OAM frame, the data amount transferred to the communication network can be reduced. Also, the PE node 30 can also receive the standard format, and a mutual connection can be established even when the opposite PE node only corresponds to the standard format.

It should be noted that according to the present fifth embodiment, for example, the CCM Period value (for example, FIG. 13A or the like) in the CCM message among the received S-OAM frame is different from a value corresponding to the expected cycle, it is also possible to display a warning on the external monitor or the like. For example, the first and second S-OAM termination units 355-1 and 355-2 hold the previously set cycle (for example, 3.3 ms), and when the CCM Period value in the S-OAM frame is a value different from the relevant cycle (for example, 10 ms), a signal indicating that the value is different is output to the CPU 360. The CPU 360 reads out, for example, a warning sentence from the memory, for example, "in I-TAG VLAN ID =XX, 10 ms set message is received with respect to the expected value 3.3 ms" to be displayed on the external monitor or the like. According to this, the setting mistakes can be determined in an early stage between the PE nodes 30.

Furthermore, the present fifth embodiment can be carried out also in the case of Loop Back message or Link Trace message other than the CCM message.

Furthermore, the S-OAM frame in which the message is shortened can be realized, for example, with one in the standard format and also one in the new format without the customer MAC address.

A sixth embodiment is an example in which the PE node 30 supports three formats of the standard format and the new format (for example, FIG. 5A and FIG. 5B) and the unique format (for example, FIG. 12B). According to the present sixth embodiment, 3 bits in the "Reserved" area in "ITAG" area (for example, in FIG. 21A) are used to determine a type of the S-OAM frame. For example, the following conditions are set:

Reserved=000: the standard format;
Reserved=001: the new format; and
Reserved=010: the unique format.

FIG. 15 shows a configuration example of the PE node 30 according to the sixth embodiment. The PE node 30 further includes a flag and a Reserved check unit (hereinafter, which will be referred to as Reserved check unit) 365.

On the basis of the S-OAM valid flag and a value stored in the "Reserved" area (hereinafter, which will be referred to as Reserved value), a transfer destination of the reception PBB frame output from the Reserved check unit 365 the frame information provision unit 351 is decided.

For example, when the S-OAM valid flag is invalid, the Reserved check unit 365 outputs the PBB frame to the reception frame processing unit 356. Also, when the S-OAM valid flag is valid and the Reserved value is a value indicating the standard format, the Reserved check unit 365 outputs the PBB frame to the first S-OAM extraction unit 353. Furthermore, when the S-OAM valid flag is valid and the Reserved value is a value indicating the new format, the Reserved check unit 365 outputs the PBB frame to the second S-OAM extraction unit 354. Furthermore, when the S-OAM valid flag is valid and the Reserved value is a value indicating the unique format, the Reserved check unit 365 outputs the PBB frame to the third S-OAM extraction unit 364.

Also, the first S-OAM termination unit 355-1 terminates the S-OAM frames in the standard format and the new format, and the second S-OAM termination unit 355-2 terminates the S-OAM frame in the unique format. The subsequent processing can be carried out similarly as in the first embodiment or the like.

Also, with regard to the transmission of the S-OAM frame, the S-OAM generation unit 358 holds the S-OAM frames in three formats and can output the S-OAM frame in any one of the three formats.

According to the present sixth embodiment, the PE node 30 can process the S-OAM frames in the three formats. According to this, for example, even in a case where in the PBB network, a node which can process the S-OAM in the new format is arranged in an initial stage, and thereafter, the S-OAM frame in the unique format is arranged, the present PE node 30 can processing without performing a change on the previously arranged node.

According to a seventh embodiment, for the determination on the type of the S-OAM frame, "TPID (Tag Protocol Identifier)" area in the "I-TAG" area (for example, in FIG. 21A) is used. For a value of the TPID inserted into the "TPID" area, one arbitrary value on a network, for example, "0×8100" (fixed value) is generally used. According to the seventh embodiment, a plurality of TPIDs are supported, and in accordance with the type of the S-OAM frame, the TPID is allocated. For example, the following conditions are set:

I-TAG TPID=0×9100: the standard format (for example, FIG. 5A);
I-TAG TPID=0×9101: the new format (for example, FIG. 5B); and
I-TAG TPID=0×9102: the unique format (for example, FIG. 12A). A configuration example of the PE node 30 according to the present seventh embodiment is similar to that of the sixth embodiment (for example, FIG. 15).

For example, the frame information provision unit 351 extracts the TPID stored in the "TPID" area from the reception PBB frame to determine a type of the S-OAM frame. For example, the frame information provision unit 351 holds information on a frame type corresponding to the TPID. Then, the frame information provision unit 351 assigns the TPID flag to the determination result on the type in the following manner and outputs the relevant flag to the Reserved check unit 365:

I-TAG the TPID=0×9100: the TPID flag=0;
I-TAG the TPID=0×9101: the TPID flag=1; and
I-TAG the TPID=0×9102: the TPID flag=2. The Reserved check unit 365 determines the type of the S-OAM frame on the basis of the TPID flag and the S-OAM valid flag and outputs the S-OAM frame or the like in accordance with the determination result to the first S-OAM extraction unit 353 or the like.

According to the present seventh embodiment too, similarly as in the sixth embodiment and the like, the present communication network system 100 can establish the mutual connection, and also it is possible to realize the reduction in the data amount.

Figure 16:
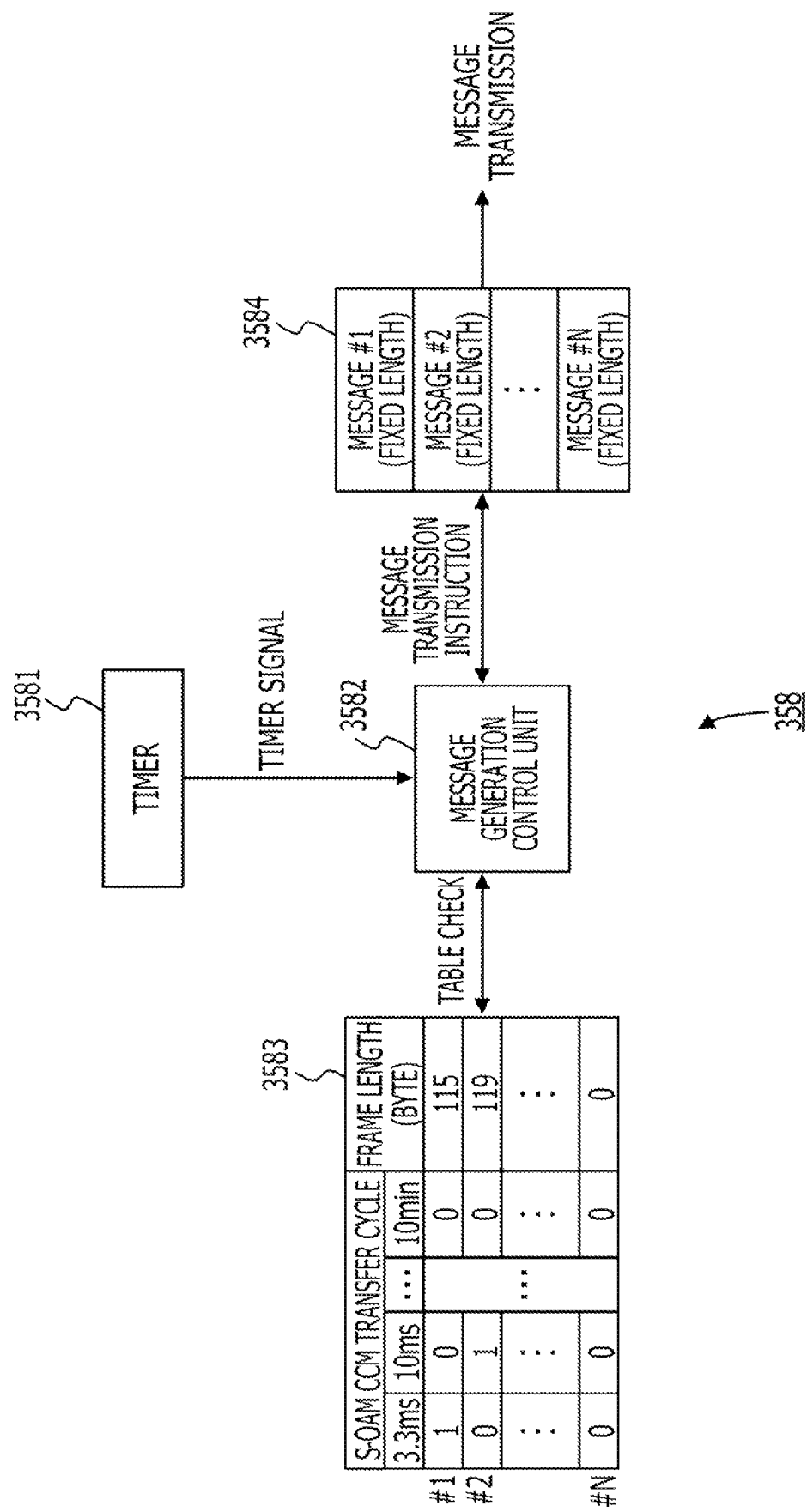
FIG. 16 shows a configuration example of an S-OAM generation unit.

FIG. 16 shows a configuration example of the S-OAM generation unit 358. As described in the first embodiment or the like, the S-OAM frame is stored in the memory and periodically read out to be transmitted. The present eighth embodiment shows a detailed example of the S-OAM generation unit 358 (for example, FIG. 3, S11).

The S-OAM generation unit 358 includes a timer 3581, a message generation control unit 3582, a transmission message management table 3583, and a transmission message table 3584.

The timer 3581 generates a timer signal indicating the transfer cycle of the S-OAM frame (for example, 3.3 ms, 10 ms, 10 min, or the like) to be output to the message generation control unit 3582.

By using the timer signal as a trigger, the message generation control unit 3582 reads out the value stored in the transmission message management table 3583.

The transmission message management table 3583 stores the transfer cycle of the S-OAM CCM (or the transfer cycle of the S-OAM frame) and the frame length of the message in units of respective message numbers (#1 to #N).

The transmission message table 3584 has a message area of a fixed length (in the example of FIG. 16, 128 bytes in the vertical direction) for each message number and stores the S-OAM frames in the respective areas. In the example of FIG. 16, the transmission message table 3584 stores N messages.

The S-OAM generation unit 358 operates, for example, in the following manner. That is, when a timer signal at a cycle of 10 ms is received from the timer 3581, the message generation control unit 3582 accesses the transmission message management table 3583. Then, the message generation control unit 3582 reads out all the entries of the transmission message management table 3583 to confirm whether or not "1" is stored in "10 ms" for the "S-OAM CCM transfer cycle". When "1" is set, the message generation control unit 3582 determines that the relevant entry is the S-OAM message transmitted at a cycle of 10 ms and calculate ["(the relevant entry number)-1" ×128 bytes] to calculate the start address. In the present example, the relevant entry number is #2, and (2-1)×128=128 becomes the start address. The message generation control unit 3582 accesses the message area of the transmission message table 3584 having the calculated start address set as the beginning and reads out the S-OAM frame by the frame length. In the present example, the S-OAM frame is read out from the message area ("message #2") where the start address is set as "128". The subsequent processing can be carried out similarly as in the first embodiment or the like.

According to an eighth embodiment, the S-OAM frame is generated by the message generation control unit 3582 or the like which is, for example, hardware and terminated by the S-OAM termination unit 355 which is, for example, hardware. In a case where the processing of generating and terminating the message is carried out by software such as the CPU 360, when the software is upgraded, reboot of the CPU 360 may be performed in some cases. Then, during the reboot of the CPU 360, the generation and termination of the S-OAM message are stopped. As the generation and termination of the S-OAM frame are performed by the hardware, it is possible to perform the transmission and reception processing of the S-OAM frame in a continuous manner.

A ninth embodiment is an example in which the message area of the transmission message table 3584 is a variable length.

Figure 17:
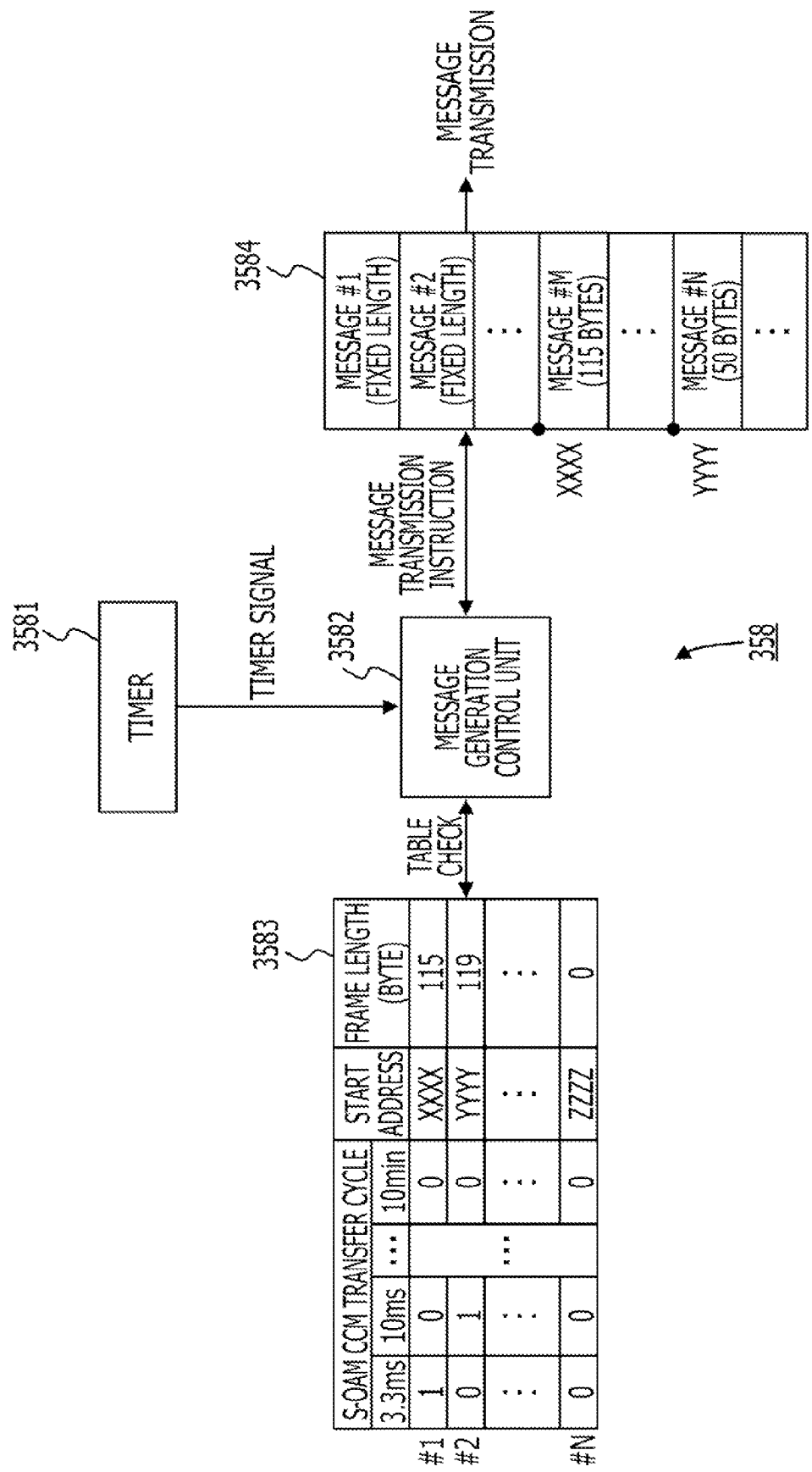
FIG. 17 shows a configuration example of the S-OAM generation unit.

FIG. 17 shows a configuration example of the S-OAM generation unit 358. The transmission message management table 3583 further includes "start address" area. The "start address" area indicates an initial address of the respective message areas of the transmission message table 3584.

For example, the message generation control unit 3582 accesses the message area whose start address is "XXXX" when the start address "XXXX" is read out from the transmission message management table 3583. Then, the message generation control unit 3582 reads out the S-OAM frame by "115" bytes for transmission while setting the start address as the beginning on the basis of a value of "frame length" area.

According to this, even when the variable S-OAM frames having extremely different lengths are stored in the transmission message table 3584, the transmission message table 3584 can be efficiently used, and as compared with the fixed length, the number of storages of the S-OAM frames can be increased. Also, as the message area in the transmission message table 3584 can handle various lengths as compared with the fixed length, it is possible to perform rearrangement of the message and the like, and the transmission message table 3584 can be efficiently used.

For example, addition and deletion of the S-OAM frame are repeatedly performed, and a free space may be generated in the transmission message table 3584 in some cases. In such a case, the S-OAM frame is stored in the free space in the transmission message table 3584, and after the storage, the CPU 360 and the like rewrites the start address of the transmission message management table 3583. According to this, the PE node 30 can save the S-OAM frame, and without affecting transmission of the S-OAM frame, it is possible to rearrange the relevant frame (e.g., defragmentation).

Figure 19:
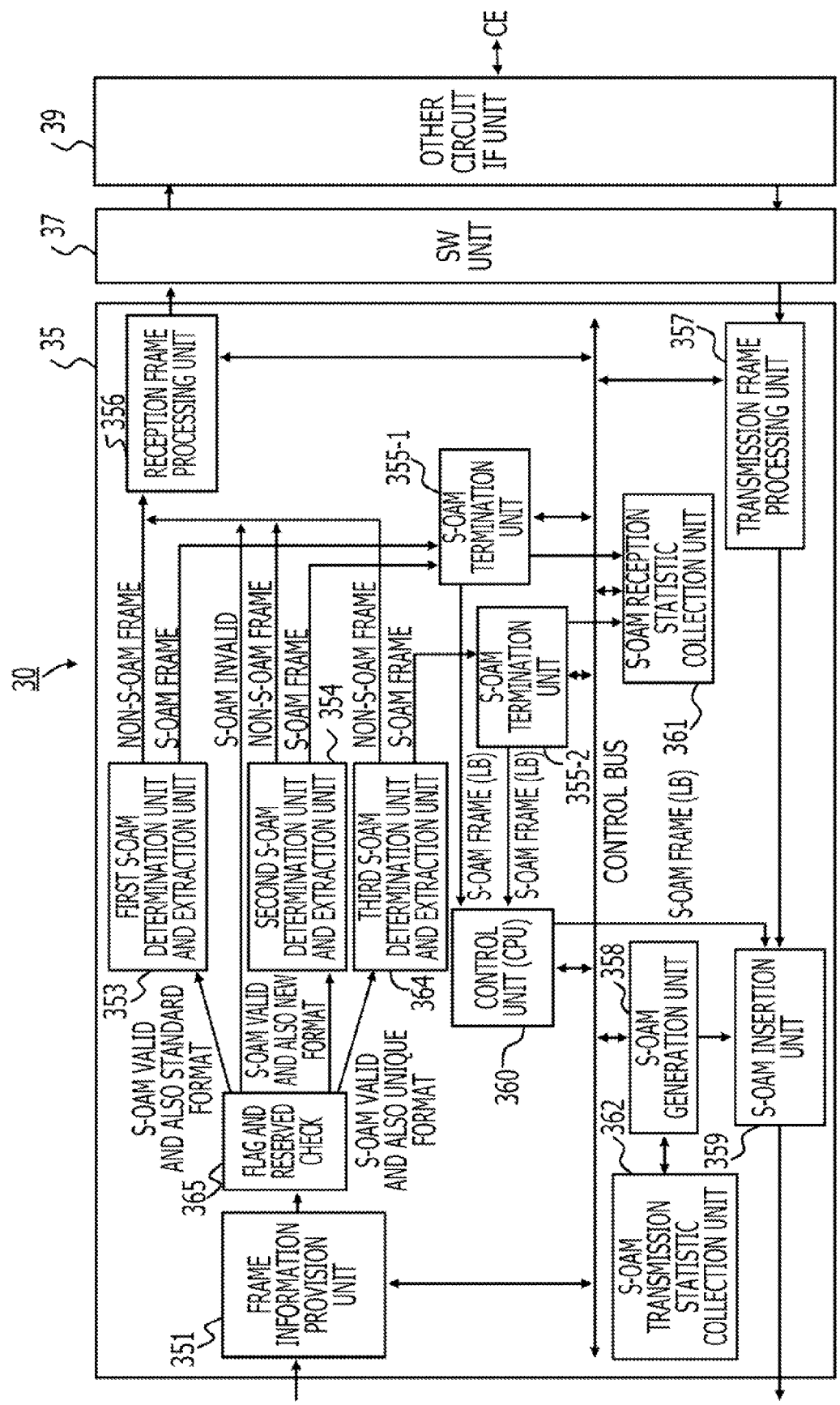
FIG. 19 shows a configuration example of the PE node.

A tenth embodiment is an example in which the PBB frame including a message other than the CCM message is terminated by the CPU 360. FIG. 18 shows an example of the frame information table 3510, and FIG. 19 shows a configuration example of the PE node 30.

As the message other than the CCM message, for example, Loop Back: LB, Link Trace: LT, and the like exist. The LB messages and the like are messages generated through an on-demand processing such as an operation by a user or an operator. Therefore, even when the CPU 360 terminates the LB message and the like, the load of the CPU 360 is smaller as compared with the CCM message.

FIG. 18 shows an example of the frame information table 3510. The frame information table 3510 has further respective areas of "CCM valid flag" and "LB valid flag".

The "CCM valid flag" area stores a value indicating whether or not the frame having the "I-TAG VLAN ID" supports the CCM message. For example, it is indicated that when the "CCM valid flag" is "1", the CCM message can be supported, and when the "CCM valid flag" is "0", the CCM message cannot be supported.

The "LB valid flag" area stores a value indicating whether or not the frame having the "I-TAG VLAN ID" supports the LB message. For example, it is indicated that when the "LB valid flag" is "1", the LB message can be supported, and when the "LB valid flag" is "0", the LB message cannot be supported.

FIG. 19 shows a configuration example of the PE node 30. The first and second S-OAM termination units 355-1 and 355-2 terminate the CCM message and output the LB message and the like to the CPU 360.

When the S-OAM frame including the LB message is received, the CPU 360 returns the LB message to the transmission source, and therefore a frame in which the "B-MAC DA" and the "B-MAC SA" are switched is generated to be output to the S-OAM insertion unit 359. The S-OAM insertion unit 359 transmits the S-OAM frame including the LB message to the PBB network.

FIG. 20 shows an example of attribute information displayed on the external monitor. A part of the attribute information is included, for example, in the above-mentioned frame information table 3510. For example, the CPU 360 reads out information held in the frame information table 3510 or the respective units 352 of the PE node 30 or the like to be output to the external monitor which is connected via the control bus. The maintenance manager or the operator can confirm the information set in the frame information table 3510 or the like. Also, the reliability related to the maintenance of the network can be improved.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A communication apparatus comprising:
a reception unit configured to,
  receive a first frame having a first format and a second frame having a second format in which information is reduced with respect to the first format and
  extract a first identifier existing in both the first frame and the second frame;
a first frame processing unit configured to process the first frame;
a second frame processing unit configured to process the second frame;
a table including a correspondence between the first identifier and a second identifier indicating whether the first frame and the second frame having the first identifier is in the first format or the second format; and
a control unit configured to transfer the first frame or the second frame to one of the first frame processing unit and the second frame processing unit based on the table when the frame is received.

2. The communication apparatus according to claim 1, further comprising:
a third frame processing unit,
wherein the table includes a third identifier indicating which one of the first processing unit, the second processing unit, and the third processing unit the first frame and the second frame should be processed while corresponding to the first identifier, and
wherein the control unit transfers the first frame or the second frame to one of the first frame processing unit, the second frame processing unit, and the third frame processing unit based on the table when the frame is received.

3. The communication apparatus according to claim 2,
wherein the table includes a fourth identifier indicating a number of user TAGs included in the frame format of the first frame and the second frame while corresponding to the first identifier, and
wherein the control unit identifies an area where the third identifier in the frame format is stored and transfers the first frame or the second frame to one of the first frame processing unit, the second frame processing unit, and the third frame processing unit based on the table when the frame is received.

4. The communication apparatus according to claim 2, wherein the reception unit is further configured to receive a third frame having a third format in which information is reduced with respect to the first format and the second format.

5. The communication apparatus according to claim 4, further comprising:
the third frame processing unit configured to process the third frame;
the table including a correspondence between the first identifier, the second identifier, and a third identifier indicating whether the first frame, the second frame, and the third frame having the first identifier is in the first format, the second format, or the third format; and
the control unit configured to transfer the first frame, the second frame, or the third frame to one of the first frame processing unit, the second frame processing unit, and the third frame processing unit based on the table when the frame is received.

6. The communication apparatus according to claim 1, further comprising:
a transmission unit configured to generate a frame having the first format or the second format and transmit the frame having the same format as the frame received from an opposite communication apparatus to the opposite communication apparatus.

7. The communication apparatus according to claim 6, wherein the transmission unit respectively stores information for identifying the first format or the second format in the frames having the first format or the second format for transmission by using an unused bit included in the first format or the second format.

8. The communication apparatus according to claim 1, wherein the communication apparatus is one of a L2 switch, a L3 switch, and a router in a communication network.

9. The communication apparatus according to claim 1, further comprising:
a collection unit configured to calculate a data transfer amount based on the first frame and the second frame received.

10. A communication method in a communication network system, the method comprising:
transmitting, by a first communication apparatus included in the communication network system, one of a first frame having a first format including a first identifier and a second frame having a second format including the first identifier in which information is reduced with respect to the first format, to a second communication apparatus included in the communication network system; and
performing, by the second communication apparatus, a frame processing corresponding to the first format or the second format based on a table accessed with the first identifier included in the received first frame or second frame, the table including a correspondence between the first identifier and a second identifier indicating whether the first frame and the second frame having the first identifier is in the first format or the second format.

* * * * *